Figure 1:
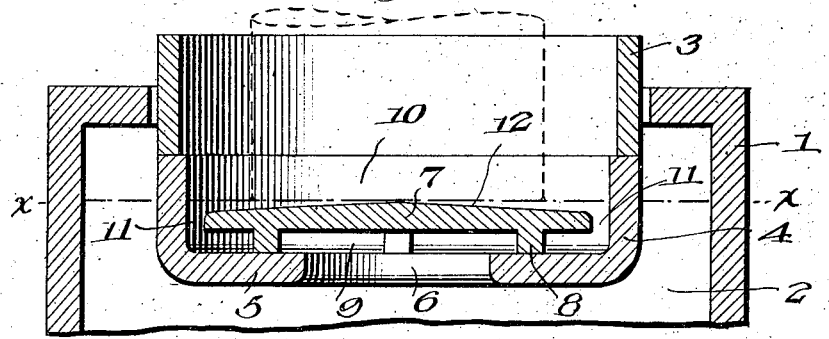

W. WESTBURY.
DRAWING RING.
APPLICATION FILED JAN. 26, 1916.

1,179,252.

Patented Apr. 11, 1916.

Witnesses
Hugh H. Ott

Inventor
William Westbury
By Victor J. Evans
Attorney

UNITED STATES PATENT OFFICE.

WILLIAM WESTBURY, OF OKMULGEE, OKLAHOMA.

DRAWING-RING.

1,179,252.  Specification of Letters Patent.  Patented Apr. 11, 1916.

Application filed January 26, 1916. Serial No. 74,470.

*To all whom it may concern:*

Be it known that I, WILLIAM WESTBURY, a citizen of the United States, residing at Okmulgee, in the county of Okmulgee and State of Oklahoma, have invented new and useful Improvements in Drawing-Rings, of which the following is a specification.

This invention relates to improvements in drawing rings of the type employed in glass drawing apparatus, for confining a portion of the molten glass from which the cylinder is directly drawn, and particularly to drawing rings of the floating type which are movable over the surface of the glass, so that after the cylinder has been drawn the ring may be moved back into the melting tank and the aftermath subjected to a proper temperature for melting it and allowing it to drain back into the body of molten glass in the tank.

In drawing glass from rings of this character, certain objections are found which result in the drawing of imperfect cylinders. Very often, owing to the fact that the glass remains at a fixed level in the ring, chilling of the glass occurs around the inner edge of the ring from the atmosphere and from the water jacket or shield used to hold the ring in place. This glass, being constantly exposed to chilling and reheating, becomes "denatured" and causes what is known as a smear, *i. e.*, heavy lines in the glass, thereby impairing its quality. Furthermore, in the use of ordinary rings having a fixed or constant glass level, the cylinder tends to float to one side or the other of the ring, whichever happens to be the hottest, until one wall of the cylinder comes in contact with a wall of the ring, causing the production of thick and thin glass or uneven thickness of the walls of the cylinder.

The primary object of the invention is to provide a drawing ring which overcomes these objections in a simple, reliable and efficient manner, and which insures the presentation of a fresh and pure charge of glass for the action of the drawing tool whereby clear glass cylinders of uniform thickness and first quality glass may be constantly drawn.

A further object of the invention is to provide a drawing ring embodying means for keeping the glass lying within the zone of the drawing tool in motion to reduce to the minimum liability of the glass becoming unduly chilled and denatured, and which also insures the location of any hardened or impure particles of glass at such a point as to be taken up by the cap of the cylinder, thus preventing the same from smearing or otherwise injuring the body of the cylinder.

The invention consists of the features of construction, combination and arrangement of parts hereinafter fully described and claimed, reference being had to the accompanying drawing in which:—

Figure 2:
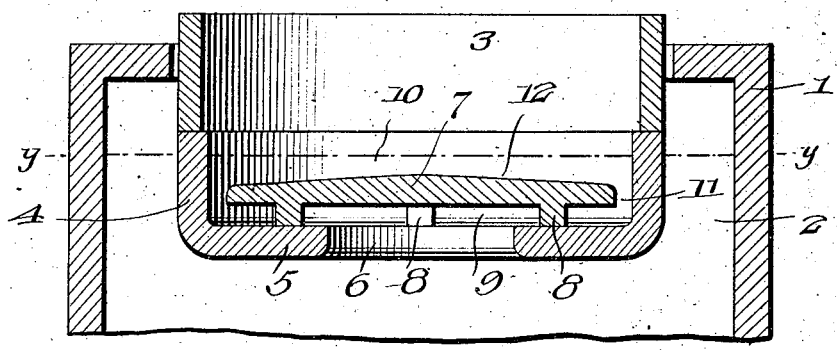
Figure 3:
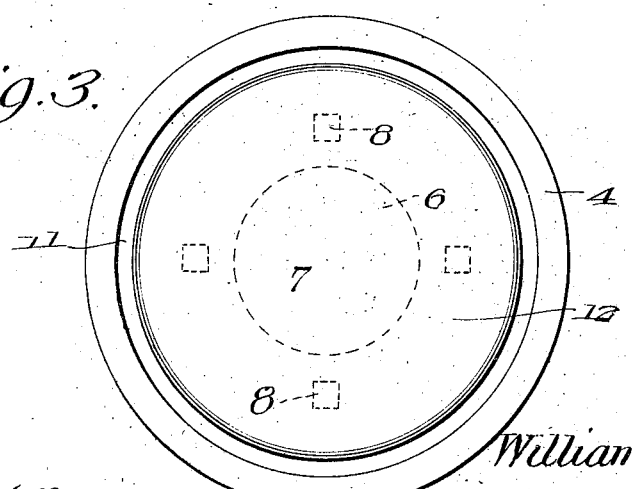

Figure 1 is a vertical section through a glass reservoir, shield and a drawing ring embodying my invention, showing the normal position of the ring. Fig. 2 is a similar view showing the position of the ring during the production of a cylinder. Fig. 3 is a top plan view of the drawing ring.

Referring to the drawing, 1 designates a doghouse or other receptacle containing the main charge 2 of molten glass from which the cylinders are to be drawn, and 3 designates a tubular shield or water jacket such as is commonly employed in the art for protecting the drawing ring, the surface of the glass and the lower portion of the cylinder to a greater or less extent from the chilling effects of the air. The shield or water jacket, however, being cooler than the ring, very commonly causes a reduction of temperature whereby the ring and the glass contained therein are chilled with the objections stated.

In carrying my invention into practice, I provide a drawing ring 4 made of fire clay or other suitable material of less specific gravity than the molten glass, so that the ring is adapted to float upon the surface of the glass for transferral back and forth between the furnace tank and the receptacle 1 at the drawing station. This ring comprises a cylindrical body having a bottom 5 formed with a combined glass inlet and drain outlet 6. This outlet is of considerably less diameter than the body of the ring, and arranged within the ring at a point between the top and bottom portions thereof is a horizontally disposed baffle or partition 7 in the form of a circular disk of somewhat less diameter than the ring body. This disk is supported in spaced relation to the bottom 5 by a series of spaced lugs or uprights 8 and separates the interior of the ring into a lower chamber or compartment 9 and an upper chamber or compartment 10, said compartments being in communication through a narrow circular feed slot or passage 11 between the ring body and periphery of the disk. The lugs or uprights 8 are arranged in such spaced relation as to provide for the provision of clear passages for the free flow of glass between said passage and the lower chamber 9 and said lower chamber and the opening 6.

The ring normally floats in the body of glass at the indicated glass level $x$—$x$, which is the normal level, and is designed to be depressed to the indicated higher glass level $y$—$y$. The upper surface 12 of the disk 7 slopes from its center toward its peripheral edge, and normally the central or highest portion of the disk lies at or slightly below the level $x$—$x$ while the remainder of such surface of the disk lies below such level, leaving the center of the face of the disk either bare or just covered with a film of glass. When, however, the ring is depressed to the level $y$—$y$ the glass will fill the upper chamber 10 to a point above the face of the disk so that the disk will be entirely submerged. In practice, the drawing ring is adapted to support the shield 3, which rests upon the rim edge thereof, and this shield is adapted to be raised and lowered by any suitable means and provides a means by which the drawing ring may be depressed to vary the level of the glass therein.

In the operation of drawing a glass cylinder the parts described are arranged in drawing position and after the ring is depressed from the level $x$—$x$ to the level $y$—$y$ the drawing tool is brought into action by disposing the bait portion thereof in the chamber 9 to take up the glass and the draw is then made, so far as the operation of the tool is concerned, in the usual manner, air being supplied to the interior of the cylinder to expand the same initially to the desired diameter and the draw then being continued while the cylinder is kept supplied with air to the desired pressure until the desired length of cylinder is drawn out. The cylinder is then severed from the bait and glass within the ring and removed for subsequent treatment, while the ring is forced back into the tank furnace for the melting of the aftermath and its regeneration and another ring drawn up into the receptacle 1 in its place for the succeeding drawing action.

It will be evident from the foregoing description that after the ring has been depressed a quantity of glass will be supplied in the chamber 10 to start the formation of the cylinder. When the cylinder has been drawn out to a certain degree and expanded to its intended diameter, the pressure upon the ring may be relaxed to allow it to rise until the surface 12 of the disk is thinly covered with the liquid glass, the glass then being drawn from the surface 12 at points between the center and periphery thereof. By this means the glass will be of sufficient depth for a reliable drawing action and yet shallow enough to allow it to cool sufficiently to adapt the glass of the cylinder to take a desired step or degree of rigidity. This action of drawing the glass from the sloping surface of the disk will also cause a movement of all glass within the ring and the feed of glass to take the place of that drawn from the chamber 9 and through the passage 11 to the surface of the disk, so that only a small amount of glass will be exposed to the cooling action of the air, the amount being just sufficient for the draw and no more, so that the denaturing of the glass as when a considerable amount of glass is constantly exposed to heating and cooling will be avoided and smears and other imperfections in the cylinder prevented. It will be understood also that the partition will protect the body of glass in the chamber 9 from the cooling effects of the air, and in the event of the breaking loose of the cylinder from the bait the partition will prevent the loose cylinder from floating in the body of glass and becoming streaked or otherwise injured. When the ring is moved back into the furnace tank and assumes its normal float level after use, it will be seen that the upper surface of the disk will be subjected to the intense heat of the furnace so that any portion of glass left thereon in the form of aftermath will be melted and drain down the sloping surface of the disk back to the chamber 9 and thence, through the movements of the disk, into the body of glass through the inlet 6 and will become reheated and regenerated or purified. If, however, any small particles of impure matter should be left remaining upon the surface of the disk the flow of the glass into the chamber 10 when the ring is again brought into operation will cause such impurities to be carried to the center or highest portion of the surface 12, so that such impurities will be taken up by the cap of the cylinder, which is later removed, and kept from reaching the body of the cylinder, as will be readily understood.

The invention thus provides a drawing ring which insures the remelting of the aftermath and the supply of pure glass of proper temperature for use so that substantially perfect cylinders may be drawn at all times.

I claim:—

1. A drawing ring comprising an annular body having an inlet opening in the bottom thereof, and a partition disk disposed within said body and in spaced relation to the bottom and sides thereof, said disk having its upper surface arranged at a point in proximity to the normal float level of the ring.

2. A drawing ring comprising a floatable body having an opening in the bottom thereof, and a horizontally disposed disk arranged within the ring above said opening, said disk having its peripheral edge spaced from the vertical wall of the ring to provide an intervening annular channel.

3. A drawing ring comprising a floatable body having an opening in the bottom thereof, and a partition disk disposed horizontally above said opening and arranged to provide a continuous annular feed passage between the same and the side wall of the ring, said disk having a sloping upper surface.

4. A drawing ring comprising a floatable body having a bottom portion provided with a central opening, and a partition disk arranged within said body and of greater diameter than said opening, said disk being supported between the top and bottom of the ring to form superposed spaces or chambers and having its peripheral portion arranged in spaced relation to the wall of the body to provide a continuous annular feed passage between the same and the body wall of the ring.

5. A drawing ring comprising a floatable body having a bottom provided with a central opening therein, and a partition disposed horizontally in said body above and of greater diameter than said opening, said partition comprising a disk supported to provide upper and lower spaces or chambers, the lower space or chamber communicating with said opening, and having its peripheral portion free from connection with and spaced from but arranged in proximity to the body wall of the ring to provide an intervening passage, said disk having its upper surface devoid of obstructions and sloping from its center to its edge.

6. A drawing ring comprising a floatable body having a contracted opening in the bottom thereof, a horizontal transverse disk arranged within said body, said disk having its peripheral edge spaced from the vertical wall of the body to provide a continuous annular intervening space, and means disposed between the bottom surfaces of the ring and disk and supporting said disk above the level of the bottom of the ring.

7. A drawing ring comprising a floatable annular body having a bottom wall provided with a feed opening therein, and a horizontal disk disposed above said opening and in spaced relation thereto, said disk being of greater diameter than the opening and of less diameter than the body of the ring, so as to provide a continuous annular channel between its periphery and the body of the ring, the upper surface of said disk being continuously sloped from its axial center to its periphery and disposed at a point adjacent to the normal float level of the ring.

In testimony whereof I affix my signature in presence of two witnesses.

WILLIAM WESTBURY.

Witnesses:
A. L. NIXON,
J. T. PANCOAST.